US011559839B2

(12) United States Patent
Mariotti et al.

(10) Patent No.: US 11,559,839 B2
(45) Date of Patent: Jan. 24, 2023

(54) METHOD AND APPARATUS FOR PRODUCING NANOSCALE MATERIALS

(71) Applicant: University of Ulster, Londonderry (GB)

(72) Inventors: Davide Mariotti, Belfast (GB); Paul Maguire, Belfast (GB)

(73) Assignee: University of Ulster, Londonberry (GB)

(*) Notice: Subject to any disclaimer, the term of this patent is extended or adjusted under 35 U.S.C. 154(b) by 483 days.

(21) Appl. No.: 16/481,141

(22) PCT Filed: Jan. 22, 2018

(86) PCT No.: PCT/EP2018/051424
§ 371 (c)(1),
(2) Date: Jul. 26, 2019

(87) PCT Pub. No.: WO2018/138042
PCT Pub. Date: Aug. 2, 2018

(65) Prior Publication Data
US 2019/0358708 A1 Nov. 28, 2019

(30) Foreign Application Priority Data

Jan. 26, 2017 (GB) .................................... 1701292

(51) Int. Cl.
*B22F 9/24* (2006.01)
*B22F 1/05* (2022.01)
(Continued)

(52) U.S. Cl.
CPC .................. *B22F 9/24* (2013.01); *B22F 1/05* (2022.01); *B22F 1/054* (2022.01); *B22F 1/056* (2022.01);
(Continued)

(58) Field of Classification Search
CPC combination set(s) only.
See application file for complete search history.

(56) References Cited

U.S. PATENT DOCUMENTS 4,023,961 A * 5/1977 Douglas ................... C09D 7/00
75/355
7,077,882 B2 * 7/2006 Kodas .................. H01G 4/0085
428/570

(Continued)

FOREIGN PATENT DOCUMENTS

WO 2014016439 A1 1/2014

OTHER PUBLICATIONS

Patel, J. et al., Synthesis of sufractant-free electrostatically stabilized gold nanoparticles by plasma-induced liquid chemistry, Nanotechnology, May 21, 2013, vol. 24.
(Continued)

*Primary Examiner* — Katie L. Hammer
(74) *Attorney, Agent, or Firm* — Standley Law Group LLP; Stephen L. Grant; Adam J. Smith

(57) ABSTRACT

A method of producing nanoscale materials comprising the steps of entraining liquid droplets containing at least one nanoparticle precursor within a gaseous stream, and passing said gaseous stream containing said liquid droplets through a non-thermal equilibrium plasma whereby said plasma interacts with said at least one nanoparticle precursor to produce nanoparticles within said droplets without substantial evaporation of the droplets and conveying the thus produced nanoparticles within said gaseous stream downstream of said plasma.

17 Claims, 13 Drawing Sheets

(51) Int. Cl.
*B22F 1/054* (2022.01)
*B22F 1/0545* (2022.01)
*B82Y 30/00* (2011.01)

(52) U.S. Cl.
CPC ...... *B22F 1/0545* (2022.01); *B22F 2301/255* (2013.01); *B22F 2304/10* (2013.01); *B22F 2999/00* (2013.01); *B82Y 30/00* (2013.01); *C01P 2004/64* (2013.01); *H05H 2245/50* (2021.05)

(56) References Cited

U.S. PATENT DOCUMENTS

| | | | |
|---|---|---|---|
| 7,083,747 B2* | 8/2006 | Hampden-Smith | C09K 11/7731 75/331 |
| 7,393,385 B1* | 7/2008 | Coffey | B03C 3/383 95/79 |
| 7,446,335 B2 | 11/2008 | Kortshagen et al. | |
| 7,828,999 B2* | 11/2010 | Yubuta | B01J 19/088 425/10 |
| 8,016,944 B2 | 9/2011 | Kortshagen et al. | |
| 8,697,479 B2 | 4/2014 | Mukherjee et al. | |
| 8,911,529 B2* | 12/2014 | Withers | B22F 9/082 75/346 |
| 2005/0226802 A1* | 10/2005 | Goodwin | C23C 4/134 422/186.04 |
| 2012/0295033 A1* | 11/2012 | Kim | C23C 14/325 427/446 |

OTHER PUBLICATIONS

Tsumaki, M. et al., Size-controlled sub-micrometer spheroidized ZnO particles synthesis via plasma-induced processing in microdroplets, Materials Letter, Dec. 10, 2015, pp. 81-84, vol. 166.

* cited by examiner

METHOD AND APPARATUS FOR PRODUCING NANOSCALE MATERIALS

FIELD OF THE INVENTION

The present invention relates to a method and apparatus for producing nanoscale materials, and in particular to a method for the production of nanoscale materials, such as nanoparticles and nanocrystals, within liquid droplets using cold plasma and to a method of delivery of thus produced nanoscale materials to a point of use.

BACKGROUND OF THE INVENTION

Recent advances in nanotechnology provide materials known as nanoparticles in the nanometre range with many potential industrial applications. Due to their unique size-dependent properties, nanoparticles offer the possibility to develop both new therapeutic and diagnostic tools.

Existing techniques for the synthesis and conjugation of nanoparticles generally use chemical synthesis which is a multifaceted and complicated procedure. In chemical synthesis, liquid solutions are generally used as precursors and the desired nanoparticles are formed using appropriate temperature conditions and reducing agents such as sodium borohydrate or sodium citrate. The surface characteristics of the nanoparticles are critical for application purposes. However, use of such reducing agents can be detrimental to nanoparticle functionality. In addition, use of such chemical synthesis methods and temperature requirements result in prolonged multi-step processes which can range from hours to days, require skilled staff and are not cost effective. Additionally, the use of harsh chemicals can be environmentally harmful.

WO 2011/063028 discloses a method of producing nanoscale materials by exposing droplets of a nanoparticle precursor solution to a very high temperature plasma (typically around 1000° C.), vaporising the droplets to release the precursor at supersaturation level, leading to condensation and formation of nanoparticles. The gas temperature when exposed to the plasma is very high and the plasma type is thermal equilibrium. Large nanoparticles normally result. Furthermore, nanoparticles produced in this way must be collected, typically after being cooled with a quenching gas, before they can be utilised, for example by application to the flesh for cancer or wound treatment.

SUMMARY OF THE INVENTION

According to a first aspect of the present invention there is provided a method of producing nanoscale materials comprising the steps of entraining liquid droplets containing at least one nanoparticle precursor within a gaseous stream, and passing said gaseous stream containing said liquid droplets through a non-thermal equilibrium plasma whereby said plasma interacts with said at least one nanoparticle precursor to produce nanoparticles within said droplets without substantial evaporation of the droplets and conveying the thus produced nanoparticles within said gaseous stream downstream of said plasma.

In a preferred embodiment said nanoparticles are conveyed to a point of use within said gaseous stream.

Preferably the temperature of the gaseous stream when exposed to the plasma does not exceed 100° C.

The droplets may have a diameter within the range of 1 µm to 100 µm, preferably within the range 1 µm to 60 µm, more preferably within the range 10 µm to 20 µm.

The flow rate of said gaseous stream may be configured to provide a droplet velocity of between 0.01 m/s and 30 m/s or more preferably between 0.1 m/s and 2 m/s.

The average droplet volume may be approximately one picolitre.

The exposure time of each droplet to the plasma is preferably approximately 120 microseconds.

The droplets may comprise a liquid carrier containing said at least one nanoparticle precursor. The liquid carrier may comprise water.

In one embodiment the nanoparticle precursor may comprise a metal salt, such as a gold salt, for example $HAuCl_4$.

The gaseous stream may be constrained to flow within a passage having a diameter of between 0.5 mm and 10 mm. In one embodiment the gaseous stream may be constrained to flow within a passage having a diameter of approximately 2 mm.

The droplets may be injected into said gaseous stream using a nebuliser, atomiser or piezoelectric based droplet generator.

In accordance with a further aspect of the present invention there is provided an apparatus for producing nanoparticles comprising a device for generating liquid droplets containing at least one nanoparticle precursor and for entraining said droplets into a gaseous stream constrained to flow within a passage, and a plasma generating means for generating a non-thermal equilibrium plasma within a region of said passage, whereby said droplets pass through said plasma region such that said at least one nanoparticle precursor interacts with the plasma to produce nanoparticles within said droplets without substantial evaporation of the droplets.

In a preferred embodiment said passage conveys said droplets within said gaseous stream downstream of said plasma region to a point of use.

Preferably the temperature of the gaseous stream when exposed to the plasma does not exceed 100° C.

In one embodiment said passage may have a diameter of between 0.5 mm and 10 mm.

The droplet generating means may provide a stream of micron-sized water or other suitable liquid droplets containing at least one nanoparticle precursor. Each droplet may contain one or more nanoparticle precursor chemicals in solution.

While in flight, each individual droplet is acted upon by plasma irradiation within said plasma region, for a very short period of time, to convert the precursor chemical to the required final chemical product. After passing through the plasma region where, each droplet may continue its flight until collected e.g. in a liquid or upon a surface or, for example, directly in living tissue to provide therapeutic treatment. No intervention is required between the generation of the final chemical/nanoparticle product and its transport and delivery to the point of use. The exposure time to the plasma is extremely short and the generation rate of the final chemical product within the droplet is very fast compared to prior art methods of nanoparticle production.

An apparatus in accordance with an embodiment of the present invention may comprise one or more containers (for example a glass capillary tube of diameter 0.5 mm up to 10 mm) within which gas flows; a small gas plasma region created within each container by electrical excitation; a droplet generator device which converts a reservoir of liquid into a stream of liquid droplets; an interface manifold to connect the droplet generator device to the container(s); a pump to supply liquid from reservoir to the droplet generator device; high pressure supply of gases including a gas mixing manifold, gas flow and pressure controllers and associated flow and pressure monitors.

In such apparatus the chemical reactor is the liquid droplet. The droplets may have a volume of approximately one picolitre ($10^{-12}$ L or 1 picolitre). Chemical synthesis processes proceed through the use of multiple separate droplet reactors. For example, in one configuration 50,000 droplets per second may be used. The apparatus may operate with one container with one or more plasma regions. The apparatus may also operate with more than one container and associated gas plasma region(s) whereby droplets from each container, undergoing different reactions can meet and coalesce in flight thus allowing multi-step or time-divided chemical reactions.

Small liquid droplets (microdroplets) may be injected into a gas using either a nebuliser, atomiser or piezoelectric based droplet generator. These droplets may then carried downstream within a narrow tube. At some position along the tube, a low temperature non-thermal equilibrium gas plasma may be created. Each droplet preferably passes through the gas plasma and remains isolated from other droplets without substantial evaporation. During its time in the plasma, each droplet is irradiated or bombarded by positive (ions) and negative (electrons) charges generated by the plasma. These charges induce chemical reactions in the droplet. Chemical reactions also occur in the gas-phase induced by the plasma creating chemical species which can then dissolve in the droplet. The droplet is preloaded with a dilute concentration of chemical precursor(s) which on exposure to the plasma region are converted to the desired end-product.

The size of the droplets may range from 1 μm up to about 60 μm diameter but with the majority in the size range 10 μm to 20 μm, where 1 μm is 0.000001 m (or 0.001 mm). The velocity of the droplets may depend on the velocity of the gas which in turn may depend on the gas flow values which can be set by the user, under certain limitations imposed by the droplet generation method or the efficiency of plasma operation. Droplet velocities of 0.1 m/s to 30 m/s may be utilised.

A wide range of available droplet generation methods may be utilised. Examples include the simple microsyringe and pump, atomisers, the Collison nebuliser, the Burgener nebuliser, ultrasonic and piezoelectric nebulisers among others.

Depending on the generator mechanism, droplets may be produced in a continuous stream or on an individual on demand basis, where the release time and the velocity of individual drops may be monitored. Droplet streams of 100,000 droplets per second passing through the plasma at speeds up to 30 m/s may be provided. The droplets may be introduced into the plasma at a fixed rate of between 1 per second and 6000 per second, at low speed (0.1 m/s to 2 m/s). Once the droplets have been generated, they are passed into the plasma region. This is a critical aspect of the process and requires engineering designs and construction of an interface device that may (i) controls the delivery of the droplet(s) from the generator to the plasma region, preferably along the central axis of the plasma, to avoid any subsequent collisions with the plasma container, (ii) matches the droplet speed and the gas flow speed associated with droplet generation, if any, with the gas speed and gas type required for efficient plasma operation, (iii) provides a controlled and sealed environment that prevents ingress of unwanted gaseous chemical species from outside.

A range of interface devices suitable for various droplet generators have been devised. For example, in a two-flow convergent model device, gas may be fed through a nebulizer to create droplets, which may carry the droplets into a 3-dimensional curtain of gas which may then feed into the plasma region. The mixing of the two gases, which need not be the same type or mass or travelling at the same speed, at the output of the nebuliser is such as to avoid turbulence and reduce the risk of droplet expulsion to the container sides, where they are lost. A two-flow angle model device injects moving droplets from the droplet generator into the faster plasma gas stream. Careful design of the injection angle and the speed and size of the droplets ensure they are carried along the axial centre of the plasma region and avoid impinging on the container walls.

A plasma consists of charged ions and electrons, where the numbers of positive and negative charges are equal, when averaged over a suitable short time period. A plasma therefore is electrically neutral but can conduct electricity, i.e. it behaves like an imperfectly conducting metal, which a value of resistivity that depend on the specific plasma characteristics. The term "plasma" is known as the fourth state of matter and has a similar scope to the words "solid", "liquid" or "gas". There is therefore an infinite number of plasma types of which a large subset are of interest for industrial applications. While frequently labelled as "plasmas", they are generally dilute plasmas, where standard gases are the dilutant. Ionisation fractions can be as low as 10-4. In this document, the term plasma refers to such dilute situations where the fraction of the gas ionised is much less than 100%. Plasmas for industrial applications have also been termed electrical discharges, discharges, microdischarges or microplasmas. However there is no consistency in the use of these terms and hereinafter, the term plasma covers all such devices and configurations.

Industrially relevant or technological plasmas can be broadly classified into those operated at low pressures (LPP) and those which operate at atmospheric pressure (APP). While nanoparticles have been formed in LPP systems and liquid droplets have been injected into such systems, producing nanoparticles in droplets is not practical, since the droplets evaporate very rapidly at low pressure. Furthermore synthesised nanoparticles need to be collected at the end of the process and cannot be delivered continuously to a remote location due to the low pressure container. Therefore only nanoparticle synthesis at atmospheric pressure in APP is considered.

Plasmas can also be classified as Thermal Equilibrium (TE) or Non-Thermal Equilibrium (NTE). The latter is more difficult to achieve and maintain in a plasma device and requires special considerations. In a TE-plasma all species (ions, electrons and gas atoms or molecules) have the same average energy, known as temperature, and the same energy distribution. The gas temperature is high, i.e. above 3000 K and typically around 10,000 K. At these high temperature/ energies, the charged species interact with gas molecules/ atoms to form, inter alia, reactive chemical radicals which can be usefully used in subsequent processes. However the high gas temperature is problematic in normal use. nanoparticles have been formed in TE-plasmas in process such as Flame Spray Pyrolysis where combustion of appropriate precursor sprays/droplets generates nanostuctural materials with engineered functionalities.

The technique was initially derived from the fundamentals of the well-established vapour-fed flame aerosol reactors that were widely practised for the manufacturing of simple commodity powders. In this situation, the plasma is there to provide high temperature and the nanoparticles are formed by coagulation. In other approaches, the precursor can be fully decomposed into atoms at high temperature by the plasma (e.g. a plasma torch) and these condense to form nanoparticles on cooling. Nanoparticles have also been fabricated by evaporation of a metal electrode using a high temperature plasma (arc). In general these are temperature driven processes where the solvent is evaporated and the remaining solute forms the nanoparticle. Particles are generally large, have a wide distribution of sizes and are unable to be engineered to a high degree of functionality. However these techniques find wide application in industrial processes for commodity powders.

In NTE-plasmas, the non-equilibrium nature allows the gas temperature to remain cool, <2000 K and typically <400 K. The positive ion temperature is also cool while the electron temperature is high, typically >10,000K. This situation allows the generation of very reactive and useful chemical species without the associated limitations of high gas temperature. In applications where human tissue or delicate plants are exposed to NTE-plasmas, these are known as cold plasmas. However in certain applications under certain conditions, hot TE-plasmas have also been labelled cold plasmas, e.g. where the plasma is short-lived or pulsed and cools down quickly or the actual plasma is somewhat remote and it's the effluent that is at a low temperature.

In this invention, the plasma remains in non-equilibrium and the gas remains relatively cold (preferably less than 100° C.). The non-equilibrium nature brings some critical advantages in addition to the low gas temperature. The electrons are very energetic and when the droplet enters the plasma, it is initially bombarded by many more electrons than positive charges and becomes negatively charged, at a potential known as the floating potential. This occurs over the first 10-8 s (10 ns) and thereafter the droplet is bombarded by equal numbers of positive and negative charges as most of the fast electrons are repelled by the negative floating potential.

The amount of negative charge acquired by the droplet depends on its size and on the plasma characteristics, in particular the charge concentration (density) in the plasma and the electron temperature (energy). These in turn depend on design and operational factors such as the plasma size and geometry, the electrical configuration and method of electrical excitation, the inanoparticleut power, power matching, gas type and flow rate, among others. The irradiation of droplets by the electrons and the existence of a floating potential are only possible with a NTE-plasma and these two factors are critical for the success of this invention in achieving high quality nanoparticle synthesis, with a narrow distribution of sizes and very high synthesis rates per droplet.

Traditional methods for fine solid particle production are based on milling grains of a solid material, condensation of vapour, or spray pyrolysis. Solid particles can be obtained from a liquid solution after atomisation of the liquid and evaporation of the solvent where uniform particle size requires droplets of equal size. Fine particle generation is also possible by solvent evaporation from the droplets generated by electrospraying. In the latter, droplets are generated using an imposed ac electric field on a jet of water. At the correct frequency, the jet disintegrates into a stream of droplets which can be dried in a stream of hot gas to form solid particles of equal size. Particle size is often large (microns) although there are examples of small, e.g. gold nanoparticles, being synthesised. The charged droplets In a standard batch chemical reactor, reactions can be very sensitive to the local environment within the reactor. This environment can vary in uncontrollable and immeasurable ways due to for example temperature gradients, chemical gradients & inhomogeneities and unanoparticleredictable convection flows & mixing. For example, the use of nanoparticles and their enhanced performance/function is most often due to their small size, compared to traditional larger microparticles. Their properties and function are often quite sensitive to size and therefore control of the absolute size and the range of sizes during the synthesis process is essential. During the batch synthesis of nanoparticles, a wide range of nanoparticle sizes may result. Also rapid and uncontrolled nanoparticle growth may occur such that many nanoparticles may coalesce into long filaments or large spheres. The nanoparticles may also vary in terms of their crystalline quality or shape. These factors impact negatively on nanoparticle performance and batch synthesis processes have increased in complexity in order to overcome these challenges.

In the method of producing nanoparticles in accordance with the present invention, the droplet volume may be approximately one picolitre ($10^{-12}$ L). With such a small volume, mixing of reactions can occur extremely rapidly, much more so than in a standard chemical synthesis or batch process. Control of the process and the quality of the end result are improved because of this rapid mixing and rapid temperature equilibration since most important chemical reactions are sensitive to the concentration of the reaction precursors and the temperature of the reactor.

Of course such a small reactor volume has a major disadvantage in that the number of nanoparticle produced per droplet (approximately 100 million) is very small. Production rates of nanoparticles vary considerably depending on material and the synthesis process. Typical values are quoted in milligrams per hour and in some cases, there is an aspiration to reach production rate values around kg per day. To increase the nanoparticle production rate in the present invention may involve increasing (scaling up) the number of droplets per second passing through the plasma and/or increasing the number of containers, such that many containers deliver nanoparticles in parallel.

A droplet size of around 10-20 microns on average may be provided, which is much smaller than the diameter of the container (approximately 2000 microns) which is turn is very small in comparison to common chemical reactor vessels.

Using a set of containers producing nanoparticles in parallel may require multiplying the number of components related to droplet creation, namely liquid pumps and nebulisers/atomisers while other, more expensive components such as the gas supply control and monitoring instruments and the plasma power supply may, with proper design, be shared among numerous containers and plasma regions.

An apparatus in accordance with the present invention may be configured and applied to situations beyond those where absolute production rate is the dominant performance parameter. Given the small size and portability of the apparatus required to produce nanoparticles, in comparison with a standard chemical laboratory, an apparatus in accordance with the present invention may operate as a low cost mini-factory for small scale nanoparticle production as and when required.

This has numerous advantages in that (i) a skilled operator and a suitably equipped laboratory is not required, (ii) nanoparticles can be generated in the required quantity, when required and delivered immediately to the point of use thus avoiding nanoparticle performance degradation with time due to the known problems of colloidal stability, leading to agglomeration, and/or the use of additional stabilising agents, which can negate the functional properties of the nanoparticles, (iii) more complex functionalised nanoparticles can be generated, tailored to the application and specific conditions in hand, without adding to the complexity of the nanoparticle synthesis process, (iv) since the high value nanoparticles are generated in situ, on demand, the synthesis parameters can be adjusted in real time to optimise the synthesised nanoparticles to the demands of the user under specific conditions pertaining at the time.

For example, gold nanoparticles (Gnanoparticle) are increasing being used for cancer radiotherapy—chemotherapy treatment. Specific procedures depend on the type of cancer, the patient, chosen diagnostic instrumentation and therapeutic treatment protocols and these impact on the requirements for Gnanoparticle properties such as size or their surface functionalization with various ligands or their delivery to the site of treatment/investigation.

Standard batch chemical reaction normally require multiple additional chemicals to maintain control of the synthesis process. This is also the case for current microreactor technology. This means that these synthesis techniques require subsequent collection, recovery and waste disposal stages which imposes a cost penalty and a time penalty. Their reaction products cannot be produced continuously without the use of complex laboratory facilities and trained personnel.

Their reaction products cannot be delivered directly to point of use, they need to be stored in an intermediate liquid, gel or solid before being transferred to point of use. This imposes limitations on quality, storage time and ease of use. Additional chemicals are typically added to maintain stability of the reaction products during storage or transfer. For example, small nanoparticles synthesised in liquid will tend to agglomerate quickly, coalescing into larger sized particles and subsequently falling to the bottom of the container. In this state their functionality is destroyed or reduced considerably. To counter this, nanoparticle surfaces are often coated with chemical compounds, e.g. chemical ligands, so as to keep them apart from neighbouring nanoparticles. These coatings interfere with the function of the nanoparticle and reduce its effectiveness. These coatings also limit the capability of modifying the nanoparticle with specific chemical or physical surface treatments or the attachment of other functional chemicals such as drugs.

In the present invention, only simple solvents and precursors may be required. For example, with Gnanoparticle synthesis a precursor solution comprised of a gold salt (HAuCl4) in acid was diluted with water to a low concentration of 0.001 M and stored until ready for use. Thereafter it was formed into droplets and carried by gas into the plasma. The gold ions from the precursor (HAuCl4) react directly with electrons that impact on the surface of the droplet and also with chemicals in the liquid created by the plasma.

The droplets are in flight and therefore can be delivered downstream in a continuous process to where they are needed and when they are needed.

A range of detailed experiments have been carried out on a number of exemplar materials and chemicals to demonstrate proof of principal and capability of the present invention.

Nanoparticle synthesis on microsecond timescales provides the potential for a step change in chemical synthesis capability across a wide range of materials and chemistries. The present invention brings together the concepts of a picolitre droplet microreactor transported in an inert gas carrier phase with low energy electron bombardment of the droplet surface supplying the highly reducing solvated electrons. Precursor loaded micron sized water droplets may be transported through a high charge density ($10^{13}$-$10^{14}$ $cm^{-3}$) cold atmospheric pressure plasma formed in a 2 mm diameter quartz capillary. The electron dose and growth timescales may be determined by local plasma conditions and the droplet time of flight through the plasma region, which can be restricted to the microsecond range. No surfactant or ligand chemistry may be required to form an electrostatically stable colloidal solution and nanoparticles can be collected in liquid, on surfaces or delivered in a pure uncoated state directly to the point of required use, such as biological tissue.

Airborne microdroplets, with a count median diameter of 15 µm, can be generated at an average rate of one per 20 µs by a parallel path atomisation nebuliser. The droplets may then carried in a 3-dimensional coaxial flow along a quartz capillary and through a short (~2 mm length) high intensity plasma region. The plasma may be created using exterior microelectrodes attached to a high frequency (13.56 MHz) and high voltage power source. The device geometry, liquid flow, gas flow and plasma excitation may be optimised to obtain laminar non-coalescing droplet flow with minimum droplet diameter and evaporation rate, low gas temperature and high plasma density. For an average gas velocity of 17 m/s, fast, high resolution imaging confirmed a lognormal droplet size distribution and operation with only a few (~5) droplets per plasma volume at any instant. The plasma-induced evaporation rate constant was estimated to be $3\times10^{-7}$ $m^2/s$ and resulted in a reduction in count median diameter of ~2 μm (~30% volume reduction). Only the smaller droplets evaporated totally, resulting in a loss of ~5% of the total droplet number and ~0.05% of the total liquid flow volume. The droplet velocities, measured across the capillary diameter, followed a parabolic velocity envelope consistent with near laminar gas flow within the quartz tube. The median time of flight through the plasma region is ~120 μm, as measured outside the quartz tube, although turbulence and drag is likely to have slowed the droplets somewhat. Net RF power into the plasma has been measured using a close-coupled inline VI diagnostic probe (Impedans Octiv Suite) after subtraction of measured cable and system impedance without plasma ignited. The power deposited into the plasma volume, was in the range 0.3 W-0.4 W, and the introduction of droplets required no additional power, indicating the droplets have little effect on the plasma and the droplet charge is a negligible fraction of the total volumetric charge.

For Au nanoparticle formation in-flight, a gold (III)-chloride-trihydrate ($HAuCl_4.3H_2O$) aqueous solution (1.0 mM $HAuCl_4$ concentration, pH 4) was made up from a solid powder (Sigma Aldrich, UK) and supplied to the nebuliser. Indicator strips were placed at the right end exit of the capillary to evaluate the pH of the droplets after exposure to the plasma and these showed no significant change in pH. In the same way, the plasma treated droplets were also collected, for 30 seconds, on TEM grids located 20 mm downstream of the plasma region. Control grids exposed to the plasma without droplets or to non-plasma treated droplets showed no nanoparticle formation. From TEM analysis the formation of high quality crystalline Au nanoparticles was observed with a lognormal size distribution of 4.4 nm count median diameter and a narrow polydispersity (Geometric standard deviation 1.5).

Estimates of precursor reduction and nanoparticle concentration have been obtained from ultra-violet/visible (UV- Vis) spectra in the range 200 nm-300 nm where precursor absorption is dominant. While the small sample volume and the dilution during collection limit the accuracy of these techniques, we estimate that >50% of the $HAuCl_4$ precursor is reduced during the plasma exposure.

It is known that nanoparticle formation is possible from a vaporised liquid precursor or colloid injected into a furnace or hot gas plasma or through the use of electrospray charged droplets. With these approaches, synthesis relies on the total evaporation of the carrier solvent. However in the present invention, the gas remains below ~360 K and only a very small volume fraction (~0.05%) of the droplets evaporate completely in flight. Thus the droplet acts as a true reactor vessel whereby metal ions are reduced due to surface electron irradiation and the internal droplet diffusion and recirculation promotes transport and mixing of reactant.

A fully developed nanoparticle distribution has been observed with the present invention for synthesis times ~120 μs, many orders of magnitude faster than reported for conventional colloidal chemistry routes. Au nanoparticle synthesis in bulk liquid via surface plasma bombardment of the liquid for 10 minutes. This results in a much larger average nanoparticle diameter (200 nm, σ=40 nm) at the 1 mM precursor concentration, while small nanoparticles (6 nm, σ=1 nm) were obtainable at 0.01 mm With the present invention, for a 1 mM $HAuCl_4$ precursor concentration with 50% reduction over a ~120 μs exposure time for each droplet, the conversion rate of $Au^{3+}$ to $Au^0$ metal atoms that contribute to nanoparticle growth is >1024 atoms per second per litre. This represents a figure of merit for the nanoparticle synthesis rate and is significantly higher, by many orders of magnitude, than the equivalent observed with traditional colloidal chemistry processes.

Other kinetic studies utilising stopped or continuous flow mixers and a selection of chemistries indicate conversion rates between 1016 and 1020 atoms per second per litre. Millifluidic and microreactor synthesis using strong ($NaBH_4$) reducing agents have been reported and estimates of conversion rates have been extracted from experimental details. For laminar flow millifluidic tubing with a reaction volume of ~150 mL, the equivalent of >1017 atoms per second per litre has been achieved. For a similar reaction volume but with turbulent mixing, 1020 atoms per second per litre have been achieved using ascorbic acid as a reducing agent. In microfluidic devices with much smaller reaction volumes (~8 μL) the equivalent of $5 \times 10^{20}$ atoms per litre per second and ~1022 atoms per litre per second are achievable for $NaBH_4$ and ascorbic acid reducing agents, respectively. Greatly enhanced conversion rates observed with isolated picolitre droplets can be partly attributed to the very rapid mixing capability afforded by such small volumes. However the possible presence of solvated electrons, one of the strongest reducing agents available, due to the electron irradiation can be expected to also play a significant role.

Solvated electron reduction of Au precursor is well understood from radiation chemistry where the formation of intermediate metastable species is known to delay nanoparticle formation and large size distributions result. Kinetic studies of the multistep mechanisms involved in $Au^{3+}$ reduction to $(Au^0)_n$ indicate induction periods of ~50-100 min which can in part be accounted for by disproportionation of $Au^{2+}$ into $Au^{3+}/Au^{1+}$ and by the comproportionation of $Au^0$ with $Au^{3+}$ into $Au^{2+}/Au^{1+}$.

At very high dose rates, however, complete reduction to $Au^0$ can be achieved before stabilisation of these intermediate species occurs. High energy electron beam irradiation of liquids in a TEM (through a $SiN_4$ membrane) produces a much higher electron dose rate compared to radiolysis and the dose is deposited into femtolitre volumes with a corresponding greater yield of reaction products.

Nanoparticle synthesis timescales are reduced from hours to minutes or even seconds under these high dose, high energy irradiation conditions, compared to steady-state radiolysis. By comparison with the droplet case, the equivalent electron dose rate is much lower, as is the irradiation energy thus allowing exploration of a hitherto inaccessible parameter space.

BRIEF DESCRIPTION OF THE DRAWINGS

Embodiments of the present invention will now be described, by way of example only, with reference to the accompanying drawings, in which:—

DETAILED DESCRIPTION OF THE DRAWINGS

Figure 1:
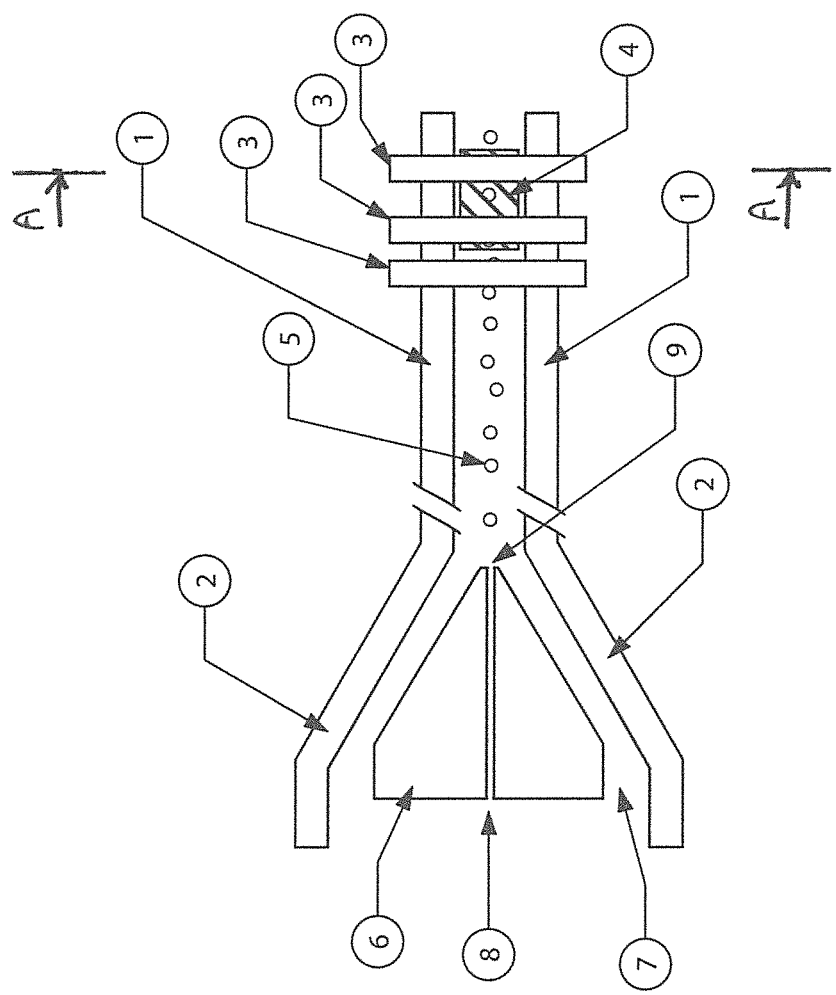
FIG. 1 is a schematic view of an apparatus for producing nanoparticles according to a first embodiment of the present invention.

FIG. 1 illustrates an apparatus for producing nanoparticles in accordance with a first embodiment of the present invention.

The apparatus comprises a plasma container tube 1 (formed from quartz, borosilicate glass, soda glass, plastic tubing or similar suitable materials) and attached to a droplet source via interface shroud 2 that provides an outer gas curtain required to supply the necessary plasma gas and allow the creation of a region of low temperature non-thermal equilibrium plasma 4 within tube 1 between electrodes 3.

The interface shroud 2 is configured to hold a droplet source attachment and interface 6. A liquid supply chamber (not shown) pumps liquid to the droplet generation unit (e.g. a nebuliser, not shown).

High pressure gas is fed to the channel 7 around the interface 6 and meets with the liquid passing out of channel 8 in the interface 6 and creates droplets 5 with a rate and size which depends on liquid viscosity, liquid flow rate, nebuliser gas type and nebuliser gas flow rate. The generated droplets 5 then pass into the plasma container tube 1 at position 9. Here the nebuliser gas and droplets mix with additional high pressure gas flowing in the surrounding coaxial channel 7. The arrangement of interface shroud 2, the interface 6 and the plasma container tube 1 is so designed so as to minimise turbulence and hence carry the droplets in a laminar manner in an axial direction along the tube 1 and with minimal collision with the walls of the tube 1.

Plasma electrodes 3 surround a downstream region of the tube 1, physically isolated from plasma and gas region by the electrically insulating side wall of the tube 1. The electrodes 3 are electrically isolated from the plasma region to the extent that no direct current (DC) can pass from electrodes 3 to plasma 4. However the electrodes 3 are capacitively coupled to the plasma to allow alternating current (AC) to flow to and from the plasma thus igniting and sustaining the plasma. A minimum of two electrodes are required. These are often known as Anode and Cathode. In a voltage symmetrical system, each electrode becomes alternately the Anode (Cathode). However often in plasma devices powered at RF frequencies, one electrode will be at a negative potential for a longer time than the other due to in-built biases. The plasma region 4 is formed between the anode and cathode and extends a short distance beyond these electrodes.

The length of the plasma extension beyond the electrodes 3 reduces as the voltage driving frequency increases. At 13 MHz, the optical extent of the plasma region 4 is seen to protrude beyond the electrodes by less than 1 millimetre. In the post-plasma region adjacent to the visible plasma region, the presence of reduced levels of charged particles (ions and electrons) creates a weak plasma afterglow region. Within approximately 3 millimetres downstream from the last plasma electrode 3, electrical probe measurements show that the total charge present is negligible.

Often a third electrode is used to facilitate ease of ignition. By establishing a regular RF voltage on any two of the electrodes, insufficient to ignite a plasma but sufficient to sustain it, the third electrode will receive a short high voltage pulse which ignites the plasma. Before this pulse disappears, the anode-cathode voltage takes over.

The length of the plasma in the tube 1, which, in combination with the speed of the droplets 5, determines the plasma exposure time of the droplets 5, is approximately that of the extent of the visible plasma which is close to the distance between the anode and cathode. For example two 0.25 mm thick electrode disks placed 1 mm apart give a plasma length of approximately 1.5 mm.

Figure 2:
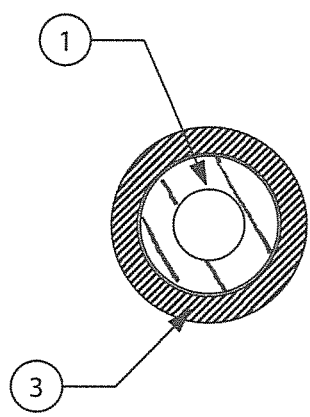
FIG. 2 is a cross sectional view on line A-A of FIG. 1.

The ignition of a plasma is dependent on a number of factors, most notably the pressure—distance (pd) relationship where distance refers to the electrode gap in a parallel plate configuration. While the device shown is a coaxial rather than parallel plate configuration, a similar relationship is known to exist. When the pd product is too small or too large, plasma ignition becomes very difficult. While the third ignite electrode is advantageous, there are effective practical minimum and maximum plasma length limits which depend on the gases used, the diameter of the tube and the thickness of the container wall, as shown in FIG. 2. For a standard glass tube of outer diameter 2.0 mm and inner diameter 1.8 mm, with helium gas and a stream of droplets, the practically convenient limits to plasma length with a pair of 0.25 mm thickness close-coupled electrode disks are 0.6 to 3 mm.

Figure 3:
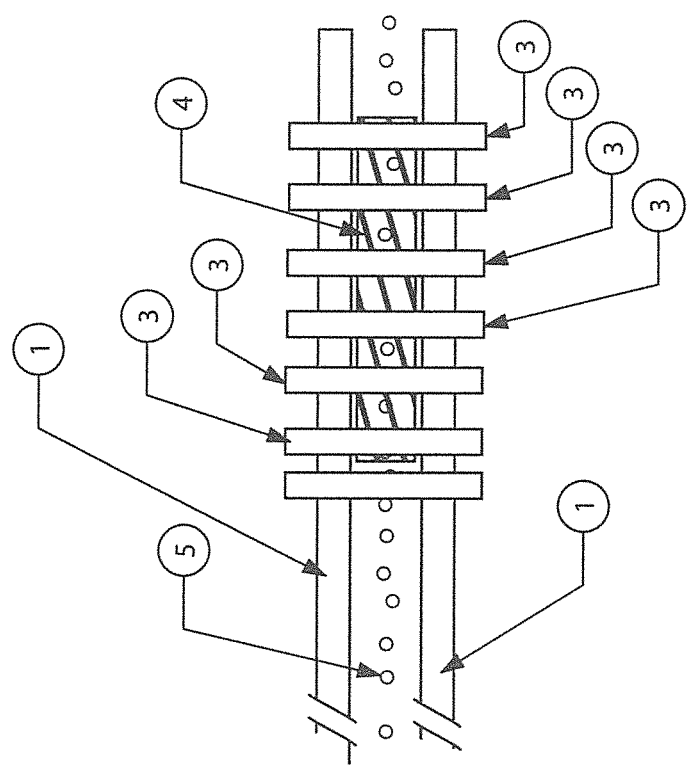
FIG. 3 is a detailed view of an end of a modified version of the apparatus of FIG. 1 with additional electrode pairs.

As illustrated in FIG. 3, the length of the plasma can be increased by using multiple pairs of electrodes 3, where each pair is connected as an anode-cathode pair to either a common power supply or multiple power supplies.

The gas temperature is a complex function of the driving voltage amplitude and frequency, gas type and plasma dimensions. With the introduction of water vapour and molecular gases into the plasma, particular attention is paid to maintaining the gas temperature low enough to avoid significant droplet evaporation. The volume of the plasma is kept small and the distance between electrodes is kept as short as possible while avoiding unwanted electrode breakdown in gas or material in other than the plasma region and avoiding the range of pd where ignition voltage must rise substantially to create a plasma. The electrodes 3 are thin annular metal rings, close fitting to the plasma containing tube 1, and separated by an air gap or by similar annular rings made of insulating materials such as Teflon® or PMMA.

The requirement for short distances between electrodes 3 to maintain a low gas temperature imposes a limit on effective plasma length and hence plasma exposure time which determines the electron flux to droplets and chemical reactions therein. While plasma exposure time can be adjusted via gas flow, an added degree of flexibility is possible with the addition of a number of electrode pairs 3 where a plasma is created between each pair, leading to an extended plasma region 4.

The electrode set comprising multiple pairs of electrodes may be powered from (i) a single power supply and associated matching unit, (ii) a single power supply and multiple matching units to account for changes in electrical conditions along the length of the plasma e.g. if there was a change in gas mixture due to the downstream addition of gases or a change in the diameter or cross-sectional area of the plasma or (iii) multiple power supplies and associated matching units to control power and frequency on each individual plasma. Electrode arrangements such as A-K-A repeated or A-K-A-K repeated are possible (where A is the anode terminal connection on the power supply and K is the cathode terminal connection on the power supply).

Electrode pairs can be placed as close to each other as is allowed between individual electrodes, in which case the plasma is continuous, or the can be spaced further apart. If the spacing between pairs is not minimum but still within the length of the post-plasma region, then the plasma will be semi-continuous such that the charged species exiting one plasma help ignite and sustain an adjacent downstream plasma. However the use of multiple but separate plasmas in series is also of benefit to allow in line control or the implementation of multiple processes.

Flexibility in spacing of plasma regions is useful in that it allows in-line optical and electrical monitoring of the process and droplets, the injection of additional gases to perform a change in chemical reactions, to quench unwanted by-products, to cool the gas if necessary by adding cooled gas of the same type, to inject or collect charged species via inserted voltage-biased metal probes, among other benefits.

Figure 4:
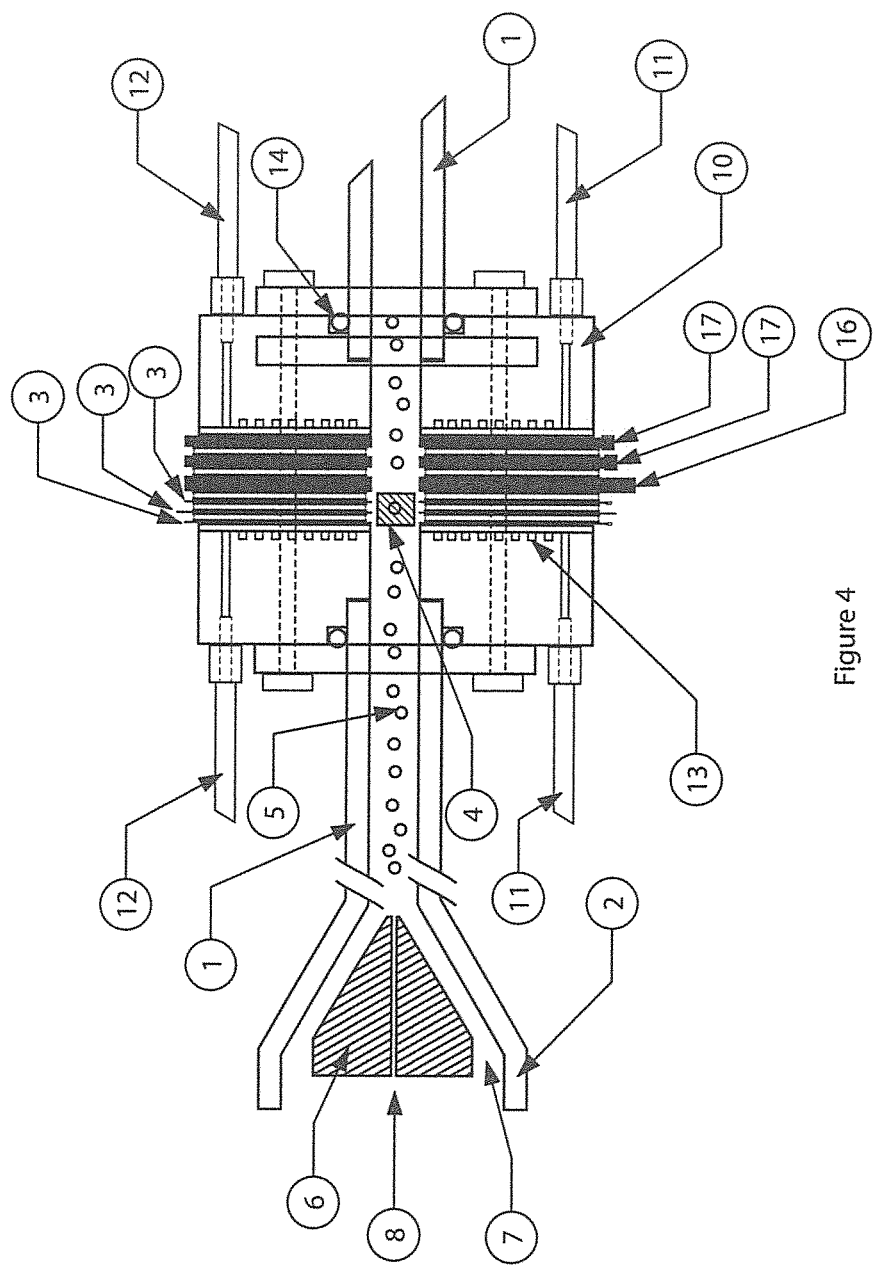
FIG. 4 is a schematic view of an apparatus for producing nanoparticles according to a further embodiment of the present invention.

In an apparatus in accordance with a further embodiment of the present invention, as illustrated in FIG. 4, a series of multiple electrodes 3 coaxially surround a central channel wherein a plasma region 4 is created. Additional components and electrodes 16, 17 can be configured to allow:—
(i) electrical measurements of the plasma;
(ii) electron injection and repulsion from the plasma by the application of a suitable voltage polarity;
(iii) droplet focussing towards the central axis by the application of a negative voltage polarity; and (iv) microchannel access for the delivery of gases in addition to the plasma and any droplet generator gas flow already present in the channel.

Figure 5:
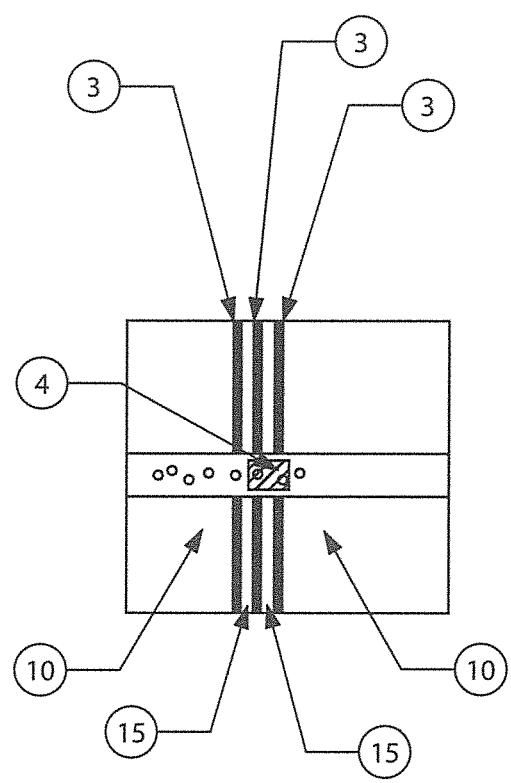
FIG. 5 is detailed view of the plasma generating means of the apparatus of FIG. 4.
Figure 6:
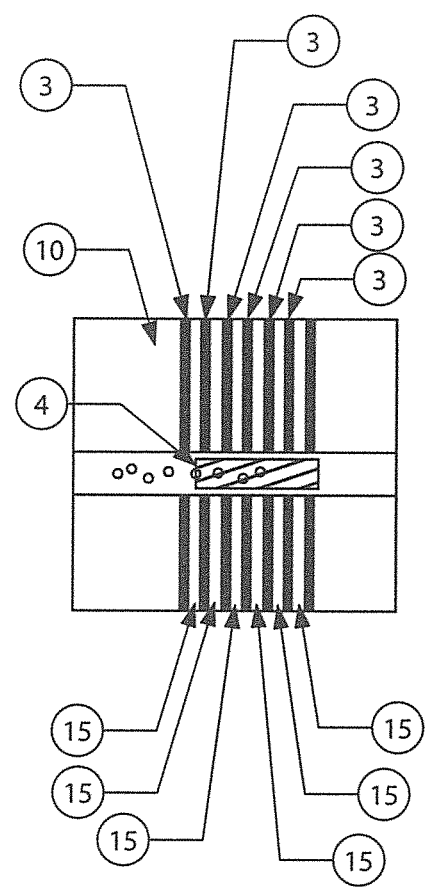
FIG. 6 is a modified version of the apparatus of FIG. 4 with additional electrode pairs.
Figure 7:
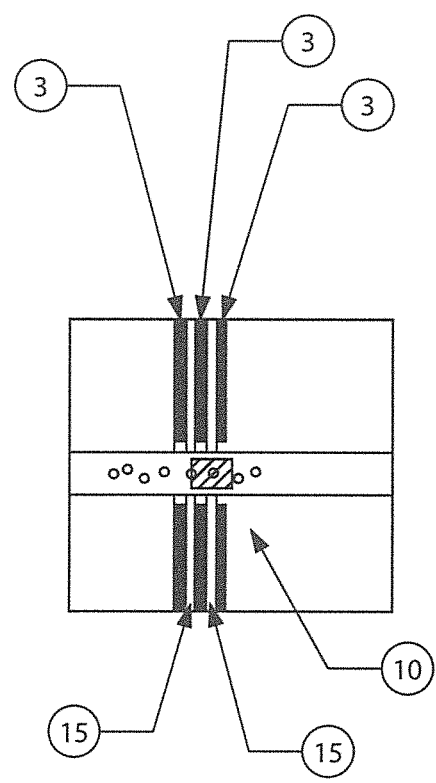
FIG. 7 is a further modified version of the apparatus of FIG. 4.

Components 16, 17 can be place in any order before or after the plasma region, or both. The plasma generating electrodes 3 can comprise multiple sets of pairs, as in FIG. 6, along with a separate ignite electrode and can be directly coupled to the plasma, as in a Type A configuration allowing voltage driving frequencies from 0 Hz up to HF frequencies. A thin dielectric/insulating spacer 15 may be provided between each electrode 3 to provide a Type B configuration as shown in FIGS. 5 to 7.

In the embodiment shown in FIG. 4, a manifold 10 can be provided, which can be made of an easily machinable material such as plastic (e.g. acrylic, Teflon®, epoxy, machinable glass ceramic etc.). In this arrangement the electrode thickness, which impacts on the plasma length and exposure time, can be varied from 1 micron up to a few millimetres. The gap between electrodes can be varied between 300 nanometres and a few millimetres. For example a low cost construction of a single electrode 3 may be achieved by the use of a standard or low loss PCB board comprising a 35 micron patterned copper layer on top of an insulating epoxy substrate, where a central drilled hole matches the dimensions of the gas channel.

A sandwich of multiple such boards, compressed and held by the manifold 10 along with associated gas tight fittings 14 may provide the series of electrodes 3. Using readily available components provides, for example, an electrode width of 35 micron and an electrode gap of around 1 mm while other dimensions can be achieved with other readily available components. This low cost approach allows for easy dismantling of the manifold and replacement of electrodes if required.

Type A configuration enables, under normal plasma conditions, lower gas temperature at a given gas flow and gas type as well as a higher concentration of electrons and the option to use simple and low cost DC power supplies. With sufficiently low gas flow, the provision of separate gas flows for plasma gas and droplet source and the interface mixing requires less accurate control or may not be required. While the gas temperature remains as low as 25° C., the region of the electrode directly exposed to the plasma may be heated up and under these conditions may supply impurity metal ions to the plasma or suffer corrosion.

As shown in FIG. 4, the inclusion of a network of microfluidic channels 13 etched into the manifold in close proximity to the electrodes 3 and other components 16, 17 and connected to a chilled water supply 11 as part of a cooling system through outlets 12 rapidly removes excess heat.

The use of an acrylic or Teflon® manifold 10 allows laser etching or micromilling of microfluidic channels with dimensions less than 100 microns. To achieve a higher level of purity, low cost metals such as copper can be replaced by noble or refractory metals which can withstand very high temperatures and suffer very little corrosion even with reactive gases. The high cost of such materials can be mitigated by the use of thin film vacuum deposition techniques to deposit a thin refractory/noble (e.g. Au, Pt, Pd) metal coating over a thicker metal, e.g. copper, before assembly.

The use of thin metal film vacuum deposition techniques to deposit metal layers directly onto an insulating substrate enables the creation of very thin electrodes, with thicknesses below 1 micron if required for very short plasma exposures. Thin film deposition of insulating layers onto metal or the use of thin insulator sheets (minimum 25 micron) as substrates provide for narrow gaps. For thin electrodes in the 20 micron-250 micron range, metal foils with a precision laser etched central hole are held on a flat or patterned insulating substrate sheet (thickness range 25-750 micron), also with a precision laser etched central hole. A series of such foils/insulator arrangements are brought together and aligned in a stack before being clamped in place by the manifold 10 or preferably are bonded through the application of elevated temperature and pressure in a vacuum environment. Using PMMA (acrylic) a temperature of 85° C. (20° C. below the polymer glass transition temperature) and a force due to pressure of 10 kN for 20 minutes under vacuum is sufficient to provide a robustly bonded electrode sandwich.

The central hole in the insulator matches or is slightly greater than the plasma gas channel to avoid disturbing the flow. In the case where the central hole in the insulator and the foil are the same then the foil is in direct contact with the plasma giving a type A configuration. If however the foil hole is slightly bigger than that in the insulator, then after high pressure-temperature bonding reflow of the plastic insulator at the inner edge of the foil hole acts to cover the metal edge and protect it from the plasma. In this case a Type B configuration is created. However the thickness of the dielectric barrier between foil and plasma is only a few microns compared to hundreds of microns in the Type B configuration of FIG. 1, where the spacing is due to electrode fitting and the thickness of the plasma containing tube 1. By this means the advantages of Type A and Type B configurations, denoted configuration AB, can be obtained when required. In particular a greater range of flow rates are possible. For example low flow and short plasma enable greater ease of charged droplet steering downstream.

FIG. 5 illustrates a Type A configuration, wherein the electrodes 3 are in physical contact with plasma region 4. Note it is generally understood that a plasma doesn't actually touch any surface that contains it, it is self-isolating to a degree but does allow a controlled amount of charge to pass to and from surfaces. Therefore an electrode is never in true physical contact with the plasma. However to distinguish between the presence or absence of a physical barrier between electrode and plasma, we use the term in direct contact to mean the absence of a physical barrier. In electrical terms, such a contact type will allow net dc current flow. With an insulating barrier, which acts as a capacitor, no net ac current flows over the frequency period although displacement, ion and electron currents are present.

In FIG. 6 multiple electrode 3 and insulator 15 layers are arranged to form a clamped or bonded stack to provide for an extended plasma region 4.

In FIG. 7 the electrodes 3 and insulators 15 are held in manifold 10. As shown in FIG. 7, in a Type B configuration the electrodes are not physical contact with plasma region 4 but separated by a physical insulating barrier. When this barrier is very thin (microns), such as that achieved by high temperature, with pressure bonding of the Electrode 3 insulator 15 stack, then the advantages of Type A and Type B configurations, denoted configuration AB, are obtained.

Figure 8:
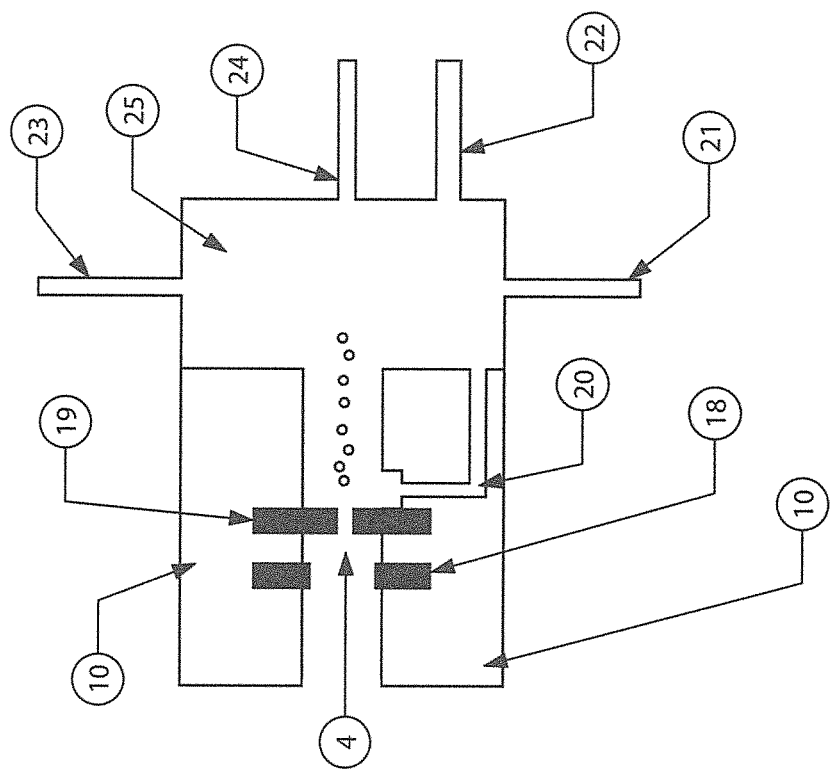
FIG. 8 is a schematic view of an apparatus for producing nanoparticles according to a further embodiment of the present invention.

As shown in FIG. 8, the versatility of the apparatus can be enhanced for particular functions using an electrode with a central hole or electrode pair 19 with a narrow gap between them, to which the power supply is attached. The gap width can be less than or equal to the width of the gas channel. For suitably narrow gaps between 10 micron and 300 micron, the plasma electron concentration can be significantly enhanced while the gas temperature remains low (<100° C.) and gas flow required is very low, almost zero.

The electrode arrangement 19 can be in the form of two metal bars, separated by a narrow gap where the plasma is created and stretching an unlimited distance in the third dimension (into page). This is known as a parallel-plate (PPP) configuration. Alternatively the electrodes 19 may comprise two flat metal electrodes on a surface create a plasma between and above them through which the droplets can pass. This is known as a surface coplanar plasma (SCP). Finally the electrodes 19 can be a single metal disk with a small hole wherein the highest density plasma is created. This is known as a high pressure Hollow Cathode-like plasma (HCP), although true hollow cathode operation is only possible at very low pressures.

All such configurations can be either Type A or Type AB by coating with a thin film dielectric layer using plasma vapour deposition techniques that are well known. Voltage application at RF or HF frequency has been found to provide the best performance since with 0 Hz, a high degree of electrode erosion can occur. HCP configurations provide highest electron concentrations for hole diameters less than 200 micron, with less than 100 micron preferred. A supply of droplets via a channel 24 generated by any of a range of droplet sources may be constrained to be within a 50 micron radius from the hole axis in order to pass through. However loss of droplets by collision with the electrode or electrodes 19 is inevitable. These may be collected in a sump 20 and passed to a drain 21.

Since the plasma requires little gas flow to operate at low gas temperature, droplets may be drawn into the plasma region 4 by the natural convection induced by the plasma. Additional gas, added via a gas inlet 22 and controlled if necessary via a gas outlet 23, can be used to increase the droplet flow with due regard to droplet loss, which may be monitored at the drain 21. Additional gas, added via a droplet inlet 24 and controlled if necessary via a gas outlet 23, can be used to increase the droplet flow with due regard to droplet loss as monitored at the drain 21.

The low flow requirement and the separation of droplet and gases allows for example the chamber fed by droplets from 24 to contain a static reservoir of droplets e.g. a mist, where the larger droplets tend to sink and smaller and lighter droplets have a higher probability of following the flow streamlines through the gap between the electrodes 19. This probability may be enhanced by suitable machining of manifold 10 to provide a cone-shaped entrance to the plasma region 4.

The HCP configuration generates a very dense plasma within the hole and a weak diffuse interelectrode plasma between electrodes 19 and electrodes 18, the latter normally being earthed. The electrodes 18 may comprise two bars or a disc, similar to plasma electrodes 19, but with a central hole or gap that can be much larger. Also electrodes 18 can be placed far away, if desired. The interelectrode weak plasma is further reduced if the electrode faces are coated in a thick insulator or are bonded on either side with insulator sheets as described above.

For HCP-AB configuration, the hole edge can be coated first with a very thin insulator before the face insulator layers or sheets are deposited, bonded or attached. Additional electrodes 19, in the manner shown in FIG. 7 and following the rationale described in FIG. 4, can be included if required. Also additional electrodes and other components can be included, as described in FIG. 4. For example small slow moving charged droplets may be more readily focussed onto the axis or steered, e.g. for coalescence purposes or to selectively deposit on a substrate. Consider a structure comprising electrode 19 with a relatively large gap and hence a lower collision rate with droplets. A very short plasma created here will be sufficient to charge droplets. A number of electrodes, similar to 17 in FIG. 4, will, with suitable applied voltage polarity, then focus the droplet to the axial centre before they arrive at the second electrode 19 which has a smaller diameter hole and a more dense plasma for inducing chemical reactions. The plasma length and therefore the plasma exposure time is varied changing the thickness of the electrode 19 or including multiple separate electrodes 19, similar in concept to FIG. 6. The latter allows for variable exposure time without replacing the electrode.

The low gas flow conditions obviates the need for tight gas fittings between electrode 19 and manifold 10 and hence electrode 19 can be easily replaced to adjust hole diameter, thickness or compensate for wear and tear.

The HCP-AB configuration provides the highest electron concentration while maintaining low gas temperature, low flow and reliability, the PPP-AB configuration allows for a greater gap (up to 300 micron) hence greater droplet throughput and extension into the third dimension to create a long stripe droplet reactor rather than a single stream reactor. The SCP-AB configuration provides a lower density plasma and the extent of the plasma above and between the electrodes 19 is non-uniform. With the addition of a manifold to form a channel to and from the SCP-AB plasma region, droplets can be made to pass through the plasma in a similar manner as outlined above. The advantage of this configuration is the ease of which multiple closely spaced plasma regions connected by gas—droplet channels can be created using standard techniques. For examples metal tracks can be patterned on one surface e.g. a PCB board or thin film deposited onto a substrate. This is followed by a thin insulator blanket coating. A plastic manifold with etched gas channels can then be aligned and fixed or bonded to the metal track substrate.

Figure 9:
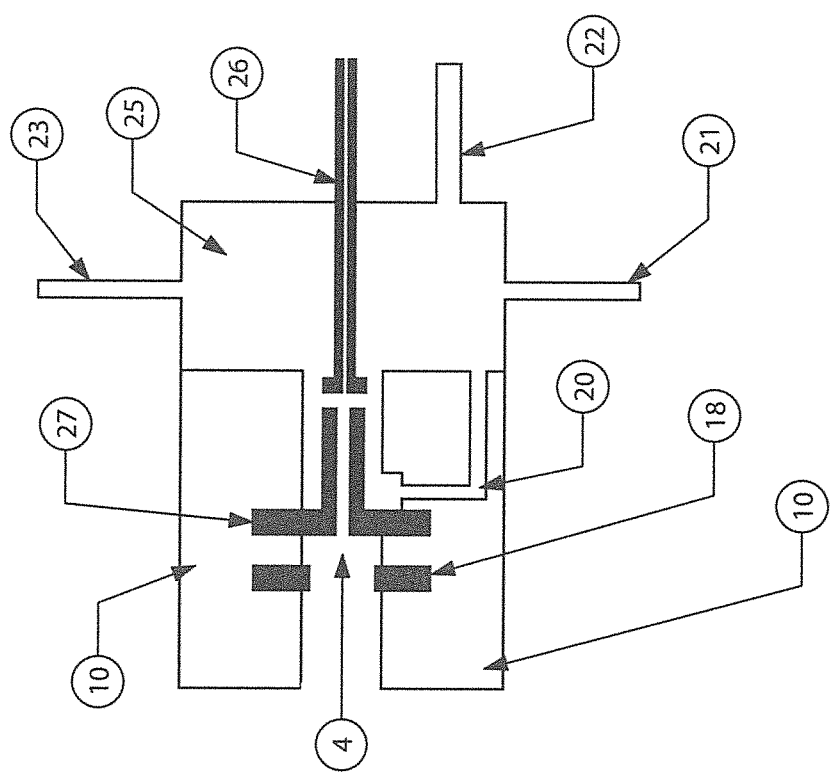
FIG. 9 is a modified version of the apparatus of FIG. 8.

FIG. 9 illustrates a method of extending the plasma length through the use of an electrode pipe 27. Also the creation of a mixed HCP-PPP configuration is shown through the inclusion of an additional moveable electrode 26 where the gap between electrodes 26 and 27 may be adjustable via a precision linear motor. When this gap is large, droplets can be supplied as in FIG. 8. However at very small gaps, the droplets can be obtained through a channel in electrode 26 connected to a suitable droplet source.

Figure 10:
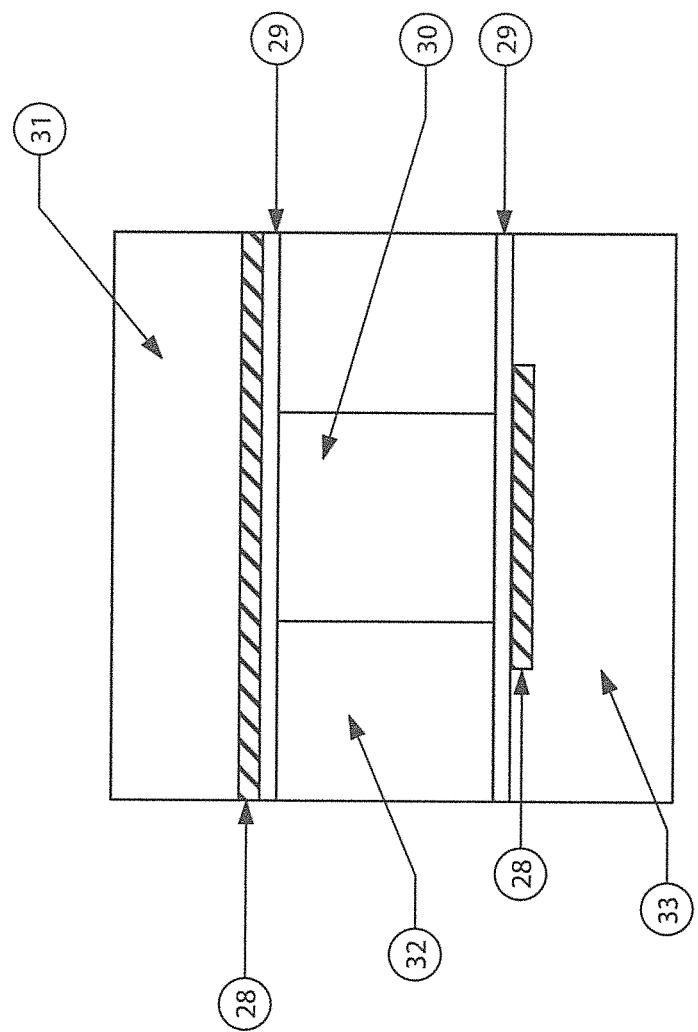
FIG. 10 is a schematic view of a plasma generating means of a modified apparatus in accordance with the present invention.

FIG. 10 illustrates the construction of a plasma region using microfluidic techniques such as etching and bonding metal, plastics or glass. The base substrate 33, which can be glass or plastic, may have a patterned metal layer 28 deposited to form one electrode of the plasma region. This may be covered with a blanket insulator layer 29 through thin film deposition or bonding a thin insulator sheet.

Channels 30 may then etched by laser or micro-milled into a manifold 32 along with a lid 31 containing a patterned metal track 28 and the base substrate may be assembled into a gas tight device, by bonding, clamping or otherwise fixing with suitable seals, and interfaced to a suitable droplet source. This may form a PPP-AB configuration.

An alternative is to form both sets of electrodes 28 on the one layer, forming an SCPAB configuration, as outlined above.

The ease of patterning metal tracks and gas channels allows the design and construction of a multipath network of plasma regions and coalescent junctions for complex processes.

Figure 11:
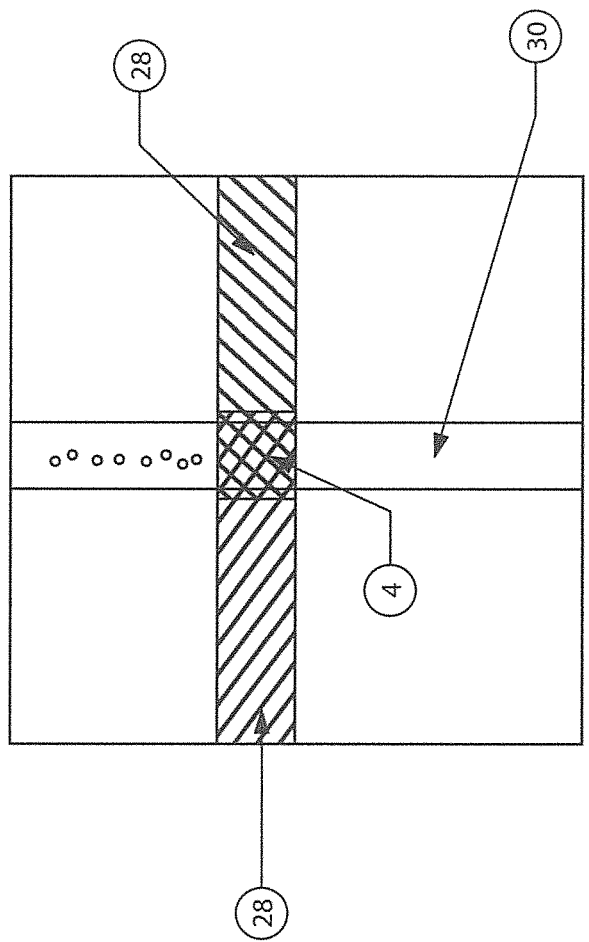
FIG. 11 is a further view of the apparatus of FIG. 10.

FIG. 11 illustrates the plan view of a PPP-AB plasma region and channels.

Figure 12:
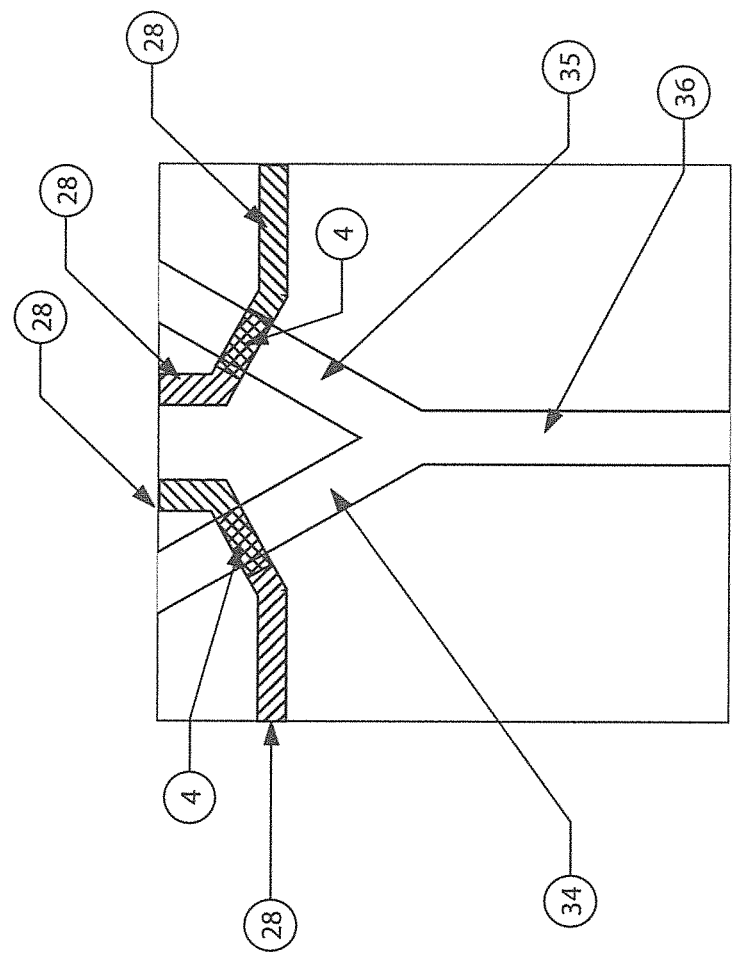
FIG. 12 is a schematic view of an apparatus for producing nanoparticles in accordance with a further embodiment of the present invention.

FIG. 12 illustrates an alternative embodiment where two separate PPP-AB plasma regions 4 and channels 34, 35 merge into a single channel 36 through a Y junction and at this junction droplet coalescence can occur.

Figure 13:
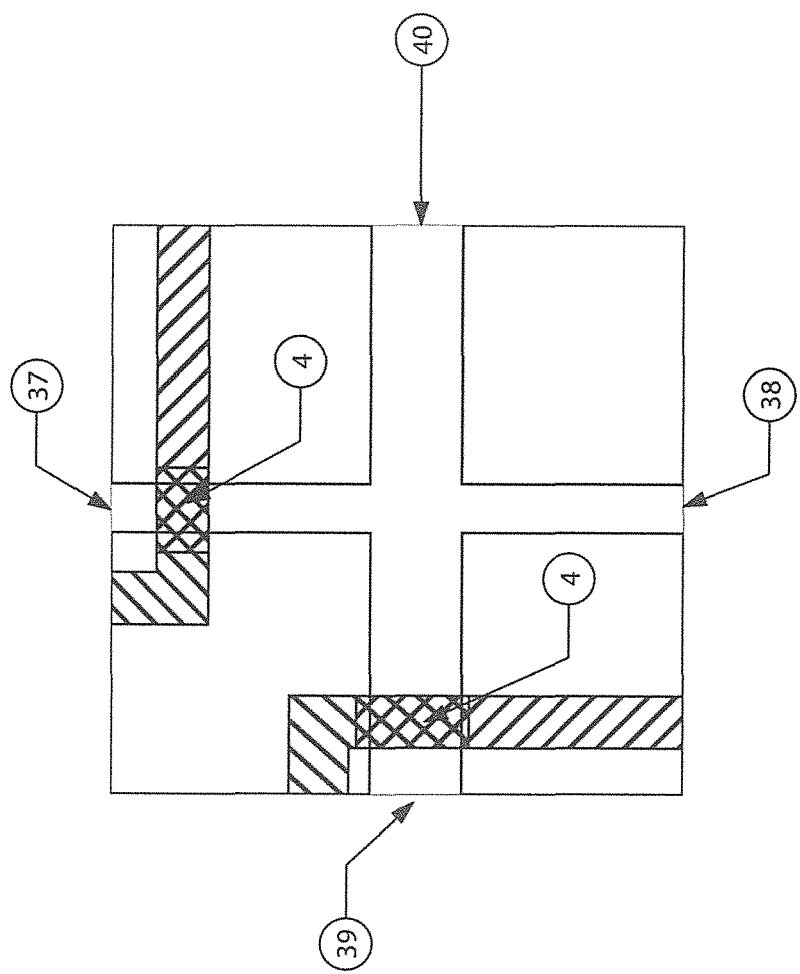
FIG. 13 is a schematic view of an apparatus for producing nanoparticles in accordance with a further embodiment of the present invention.

FIG. 13 illustrates an alternative embodiment where two separate PPP-AB plasma regions 4 and channel inlets 37, 39 cross at an X junction. At this junction droplet coalescence can occur.

The deliberate and controlled coalescing of droplets from different sources can be synergistic and beneficial. For example a droplet passing through a plasma leading to the synthesis of a large number of nanoparticles may meet a droplet from another source containing a payload that interacts with nanoparticles to functionalise their surface to some specific purpose or to mix with the nanoparticles or be coated by nanoparticles.

Examples of payloads include drug-bearing materials, chemical ligands, polymers, other nanoparticles/microparticles or biological cells, among others. For example coating droplet synthesised nanoparticles with biocompatible polymers may improve cellular uptake for medical applications while activating their surfaces with simple ligands such as hydrogen (e.g. Si:H), sulphur (e.g. Fe:S), carbon and $NH_3$ etc. for catalysis or functional nanomaterials.

The decorating of larger nanoparticles/microparticles or biological cells, such as bacteria and microbes, may provide a plasmonic or photonic functional enhancement such that for example airborne particles may be visualised or solid state devices such as quantum dot based solar cells, which rely on accurate mixing of different nanoparticles, may be assembled bit by bit in flight then deposited onto the required surface, to ensure much greater uniformity of mixing than can currently be achieved.

Loading nanoparticles with drugs and biomarkers is an important research activity for the detection and treatment of disease such as cancer. Adding a mixture of chemicals and drugs to the initial droplet allows the synthesis of nanoparticles followed in situ by their coating with suitable drug-bearing ligands. However for certain situations a multi-step approach is preferred and in this case, droplet coalescence from multiple droplet sources provides a solution. This sequential chemistry process requires two or more channels each carrying a droplet stream to meet.

Each channel may have an upstream plasma region with separate plasma controls and gas mixtures allowing different plasma processes to occur in each droplet stream before coalescence. Also channels may have upstream charging regions to provide a positive charge on the droplets i.e. of opposite polarity to the natural charge on the droplet exiting a plasma or a neutralising region to remove charge from the droplets. Various channel junction architectures can be employed. For example a Y junction, as shown in FIG. 12, merges both streams 34, 35 into a single stream containing coalesced and uncoalesced droplets.

Through adjustment of size/velocity distributions and droplet density in each stream, an X junction, as shown in FIG. 13, can prioritise one stream over another. For example consider a first stream 37 containing a relatively sparse train of fast moving nanoparticle loaded droplets, of size say 20 micron, made to intersect with a second stream 39 containing a very high density of slow moving droplets with a suitable payload. The droplets of the first stream 37 with high probability would collide with many smaller droplets of the second stream 39 but would continue in their original direction undeflected to outlet 38. The outlet 38 would consist mainly of the larger droplets coalesced with a sufficient number of small droplets from the second stream 39 to achieve the required function. The mass difference between the desired large droplets and any undesirable small unreacted droplets from the second stream could be separated by mass through flow separation beyond the outlet 38. Unreacted droplets would dominate the outlet 40 of the second stream 39 and could therefore be collected and reused.

Use of one or more droplet on demand (DoD) systems for aerosol generation, through direct visual monitoring and control of droplet flight, may allow direct control of individual droplet to droplet coalescence. The coalescing rate may be lower but the efficiency may be improved for precise mixing and control of relative droplet size is much greater. After coalescence, the merged droplet stream can be made to meet another stream of droplets at a further junction. In fact a network of such channels containing multiple plasma, charging/neutralising regions and droplet inlets is possible in order to achieve complex multistep processing.

The interaction of in-flight plasma treated droplets with other gas-phase chemical species and particles can be used in pollution remediation or airborne pathogen destruction.

For example, injection of suitable plasma treated droplets, carrying reactive radicals and nanoparticles into downstream diesel fume exhausts can be used to dissociate poisonous $NO_x$ gases and also reduce or eliminate particulate aggregates.

Pathogens such as bacteria are susceptible to plasma-induced destruction with high efficiency. However the density and throw of a standard plasma with regard to delivering its payload over sufficient distances (greater than a few millimetres) is problematic and expensive when dealing with airborne microbial and fungal pathogens. Furthermore these pathogens often exist in spore form and are mixed with inorganic matter such as dust. The use of a plasma treated aerosol spray allows the plasma activated chemicals to be delivered to and coat pathogens in any airborne form.

Plasma destruction of bacterial cells has been observed in droplets that have passed through a plasma. Also exposure of bacterial (*E. coli*) colonies to plasma exposed droplets up to 20 cm downstream of the plasma demonstrated much greater kill efficiency for greater distances compared to plasma exposure of the colonies directly without droplets.

The invention claimed is:

1. A method of producing nanoscale materials comprising the steps of:
    entraining, within a gaseous stream, liquid droplets comprising a liquid carrier, said droplets containing at least one nanoparticle precursor;
    passing said gaseous stream, containing said liquid droplets, through a non-thermal equilibrium plasma, whereby said plasma interacts with said at least one nanoparticle precursor to produce nanoparticles within said droplets without substantial evaporation of the droplets; and
    conveying the thus produced nanoparticles within said gaseous stream downstream of said plasma.

2. The method of claim 1, wherein said nanoparticles are conveyed within said gaseous stream for direct use.

3. The method of claim 1, wherein the temperature of the gaseous stream when exposed to the plasma does not exceed 100° C.

4. The method of claim 1, wherein said droplets have a diameter within the range of 1 µm to 100 µm.

5. The method of claim 1, wherein said droplets have a diameter within the range 1 µm to 60 µm.

6. The method of claim 1, wherein said droplets have a diameter within the range 10 µm to 20 µm.

7. The method of claim 1, wherein the flow rate of said gaseous stream is configured to provide a droplet velocity of between 0.01 m/s and 30 m/s.

8. The method of claim 1, wherein the flow rate of said gaseous stream is configured to provide a droplet velocity of between 0.1 m/s and 2 m/s.

9. The method of claim 1, wherein the average droplet volume is approximately one picolitre.

10. The method of claim 1 wherein the exposure time of each droplet to the plasma is approximately 120 microseconds.

11. The method of claim 1, wherein the liquid carrier is water.

12. The method of claim 1, wherein the nanoparticle precursor is a metal salt.

13. The method of claim 12, wherein the nanoparticle precursor is a gold salt.

14. The method of claim 13, wherein the nanoparticle precursor comprises $HAuCl_4$.

15. The method of claim 1, wherein said gaseous stream is constrained to flow within a passage having a diameter of between 0.5 mm and 10 mm.

16. The method of claim 1, wherein said gaseous stream is constrained to flow within a passage having a diameter of approximately 2 mm.

17. The method of claim 1, wherein said droplets are injected into said gaseous stream using a nebuliser, atomiser or piezoelectric based droplet generator.

* * * * *